Dec. 2, 1930.   J. O. McKEAN   1,783,911
BOBBIN SUPPLY TRUCK FOR WINDING MACHINES
Filed Oct. 7, 1929   2 Sheets-Sheet 1
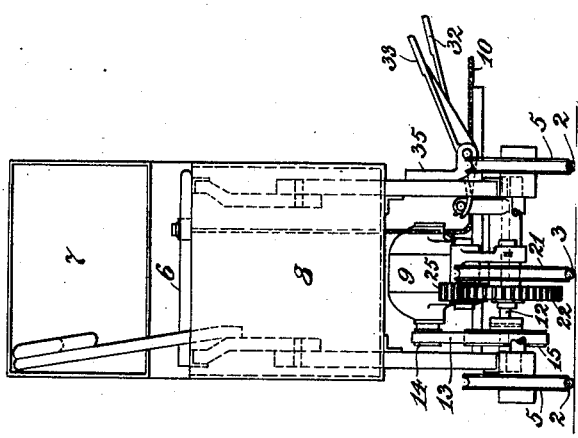
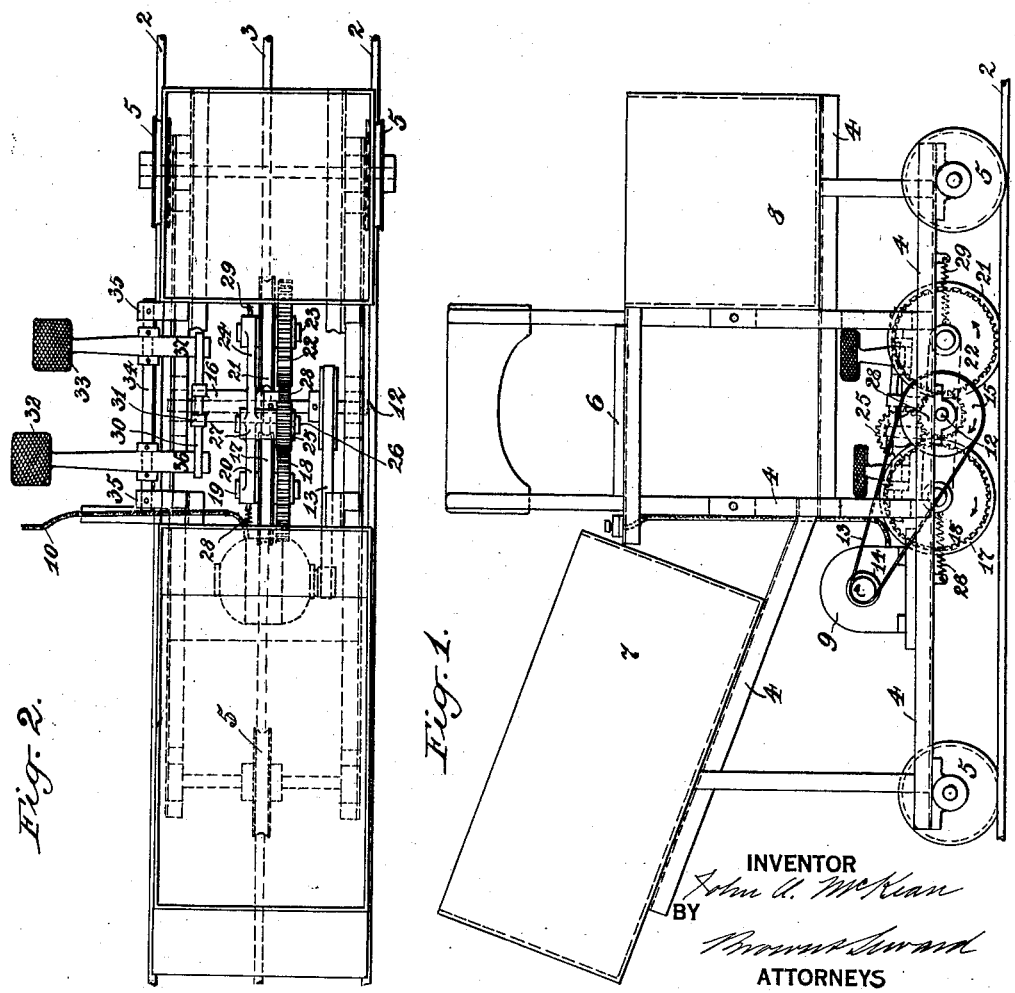
INVENTOR
*John O. McKean*
BY
ATTORNEYS

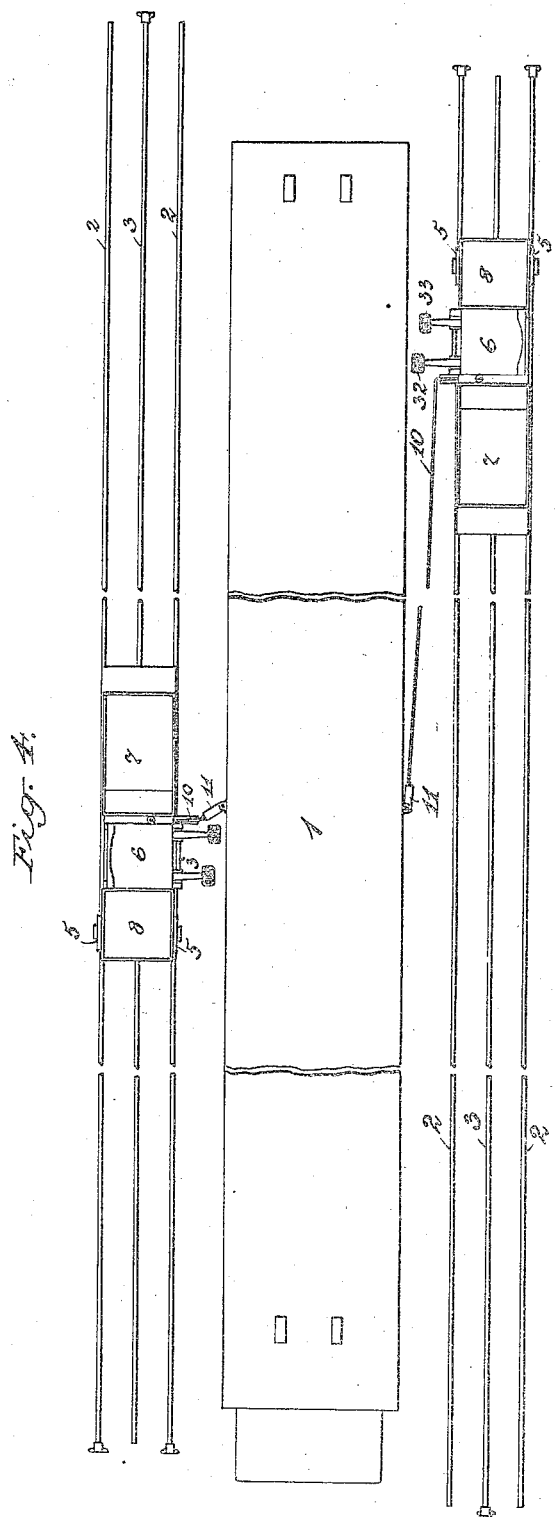

Patented Dec. 2, 1930

1,783,911

UNITED STATES PATENT OFFICE

JOHN O. McKEAN, OF WESTFIELD, MASSACHUSETTS, ASSIGNOR TO FOSTER MACHINE COMPANY, OF WESTFIELD, MASSACHUSETTS, A CORPORATION OF MASSACHUSETTS

BOBBIN-SUPPLY TRUCK FOR WINDING MACHINES

Application filed October 7, 1929. Serial No. 397,937.

The object of my invention is to provide means for facilitating the replacement, in a thread or yarn winding machine, of empty bobbins by full bobbins, said means comprising a truck which is arranged to carry the operator and which may be caused to travel back and forth on a track along the side of the winding machine; said truck being provided with a seat for the operator and having removable containers for the supply of full bobbins and for the reception of the empty bobbins, said containers being located in convenient positions with respect to the operator.

My invention, more particularly, comprises a truck of the above character which is provided with a manually controlled driving mechanism including two oppositely driven driving wheels normally held out of their driving position, means being provided under the control of the operator for moving either one of the driving wheels into its driving position for moving the truck in the one or the other direction, as desired.

My invention still further comprises a truck having an electric motor drive, the motor current supply cable connecting the motor to a fixed source of current supply, preferably located about midway the travel of the truck, a cable take-up device of any well-known or approved construction being provided for automatically taking up or paying out the cable as the truck moves along the side of the winding machine.

My invention contemplates the use of two of these trucks, one for each side of the winding machine.

A practical embodiment of my invention is represented in the accompanying drawings, in which Fig. 1 represents the truck in side elevation with one of its driving wheels moved into its driving position in contact with its track rail;

Fig. 2 represents the truck in top plan with the operator's seat removed to show more clearly the truck driving mechanism beneath the seat;

Fig. 3 represents the truck in end elevation; and

Fig. 4 represents a detail diagrammatic top plan view of a thread or yarn winding machine with two of my trucks located at different positions along the machine on opposite sides thereof.

The winding machine which may be of any well known or approved form is denoted by 1. Along each side of the winding machine I locate the tracks for the bobbin supply trucks, each track in the present instance comprising the side rails 2, 2 and an intermediate rail 3.

The supply truck frame is denoted as a whole by 4 and it is provided with three traction wheels 5, 5, 5, two of which wheels are fitted to roll along the side rails 2, 2 and the third wheel along the intermediate rail 3, of the track.

A seat 6 is provided on the truck frame 4 for the operator. Removable containers 7 and 8 for a supply of full bobbins and for the reception of the empty bobbins respectively, are supported by the truck frame upon opposite sides of the operator's seat, the container 7 for the supply of full bobbins being preferably supported in a position inclined downwardly toward the operator for automatically bringing the full bobbins in the container into convenient reach of the operator.

The operator controlled driving mechanism for the truck may be constructed, arranged and operated as follows:

An electric motor 9 of any well known or approved form has its current supply cable 10 connected to a fixed point, preferably about midway the travel of the truck along its track to provide as short a cable as possible. The cable may be provided with an automatic cable take-up device 11 of any well known or approved form so that as the truck moves back and forth along the side of the machine the cable will be taken up or let out as necessary, thereby keeping the cable taut at all times so that it will not become entangled with the truck or its driving mechanism.

This electric motor 9 drives a cross shaft 12 rotatably mounted in suitable bearings in the truck frame. In the present instance I have shown a driving belt 13 passing around a pulley 14 fast on the motor shaft and a pulley 15 fast on the said cross shaft, as the driving connection between the motor and cross shaft.

A drive wheel 17 and its gear 18 are loosely mounted on a stud shaft 19 carried by one arm of a rocking lever having its hub 16 loosely mounted on the cross shaft 12. Another drive wheel 21 and its gear 22 are loosely mounted on a stud shaft 23 carried by another arm of said rocking lever, while an idler pinion 25 meshing with the gear 18 is loosely mounted on a stud shaft 26 carried by a third arm 27 on said rocking lever. A pinion 28 fast on the cross shaft 12 meshes both with the idler pinion 25 and also with the gear 22 so that the two driving wheels 17 and 21 are driven at all times in opposite directions when the motor is running.

Means are provided for normally holding the driving wheels 17 and 21 away from engagement with the intermediate track rail 3 in their non-driving position. In the present instance I have shown two coiled springs 28 and 29 for this purpose, which springs extend from the truck frame to the rock lever arms 20 and 24, respectively.

The means which I have shown for manually rocking the driving wheel carrying lever to move the one or the other of the driving wheels 17 or 21 into its driving position on contact with the intermediate track rail 3 is as follows:

A pin 30 is carried by lugs 31 uprising from the hub 16 of the driving wheel carrying lever. Foot pedals 32 and 33 are loosely mounted on a bar 34 carried by brackets 35 on the truck frame, said pedals having arms 36 and 37 engaging the underside of the pin 30, upon opposite sides of the hub 16 so that when the pedal 32 is depressed the lever will be rocked to bring the driving wheel 21 into its driving position to cause the truck to travel in one direction along the winding machine and when the pedal 33 is depressed the other driving wheel 21 will be brought into its driving position to cause the truck to travel in the opposite direction along the winding machine.

From the above description it will be seen that the truck may be moved readily to different positions along the side of the machine for removal of empty bobbins and replacement by full ones, the truck being at all times under the control of the operator whereby it may be brought rapidly to the desired points. It will also be seen that when the empty bobbin container becomes full it may be quickly replaced by an empty container and that when the full bobbin container becomes empty it may be quickly replaced by another container having a supply of full bobbins.

It is evident that various changes may be resorted to in the construction, form and arrangement of the several parts without departing from the spirit and scope of my invention; hence I do not intend to be limited to the particular embodiment herein shown and described, but what I claim is:—

1. A bobbin supply truck arranged to travel back and forth in a fixed path along the side of a winding machine, and a driving mechanism for said truck comprising an electric motor fixedly mounted on the truck and flexibly connected to a fixed point of electric current supply, two driving wheels driven by the motor in opposite directions, spring means for yieldingly holding said wheels out of their driving position and means under the control of the operator for moving either of said wheels into its driving position for moving the truck in the one or the other direction.

2. A bobbin supply truck arranged to travel back and forth in a fixed path along the side of a winding machine, and a driving mechanism for said truck comprising an electric motor fixedly mounted on the truck and flexibly connected to a fixed point of electric current supply, two driving wheels driven by the motor in opposite directions, spring means for yieldingly holding said wheels out of their driving position and foot pedals operatively connected with said wheels whereby either of said wheels may be moved into its driving position for moving the truck in the one or the other direction.

3. A bobbin supply truck arranged to travel back and forth in a fixed path along the side of a winding machine, and a driving mechanism for said truck comprising a motor, a cross shaft driven thereby, a rocking lever loosely mounted on the cross shaft, two driving wheels carried by the lever and driven from the cross shaft in opposite directions, spring means for yieldingly holding the wheels out of their driving position, and means under the control of the operator for rocking said lever to move either of said wheels into its driving position for moving the truck in the one or the other direction.

4. A bobbin supply truck arranged to travel back and forth in a fixed path along the side of a winding machine, and a driving mechanism for said truck comprising a motor, a cross shaft driven thereby, a rocking lever loosely mounted on the cross shaft, two driving wheels carried by the lever and driven in opposite directions from said cross shaft, spring means for yieldingly holding said wheels out of their driving position and foot pedals engaging said rocking lever whereby the depression of one pedal will move one driving wheel into its driving position and the depression of the other pedal will move the other driving wheel into its driving position for movng the truck in the one or the other direction.

5. In combination with a winding machine, of a three rail track located along one side of the same, a bobbin supply truck arranged to travel back and forth on said track, and a driving mechanism for said truck comprising a motor, two driving wheels driven thereby in opposite directions and means under the control of the operator for moving either of said wheels into engagement with the intermediate track rail for moving the truck in the one or the other direction.

In testimony, that I claim the foregoing as my invention, I have signed my name this 2nd day of October, 1929.

JOHN O. McKEAN.